(12) United States Patent
Chiba et al.

(10) Patent No.: US 10,509,225 B2
(45) Date of Patent: Dec. 17, 2019

(54) TRANSMISSION TYPE SCREEN AND HEAD-UP DISPLAY DEVICE USING SAME

(71) Applicant: Dai Nippon Printing Co., Ltd., Tokyo (JP)

(72) Inventors: Tsuyoshi Chiba, Tokyo (JP); Shogo Kubota, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 112 days.

(21) Appl. No.: 15/548,244

(22) PCT Filed: Feb. 3, 2016

(86) PCT No.: PCT/JP2016/053200
§ 371 (c)(1),
(2) Date: Feb. 6, 2018

(87) PCT Pub. No.: WO2016/125824
PCT Pub. Date: Aug. 11, 2016

(65) Prior Publication Data
US 2018/0348512 A1    Dec. 6, 2018

(30) Foreign Application Priority Data
Feb. 4, 2015  (JP) ................. 2015-019904

(51) Int. Cl.
*G02B 27/01* (2006.01)
*G03B 21/20* (2006.01)
(Continued)

(52) U.S. Cl.
CPC .......... *G02B 27/0101* (2013.01); *B60K 35/00* (2013.01); *G02B 3/0056* (2013.01);
(Continued)

(58) Field of Classification Search
CPC .............. G02B 27/0101; G02B 3/0056; G02B 5/0221; G02B 5/0278; G02B 27/48;
(Continued)

(56) References Cited

U.S. PATENT DOCUMENTS 5,760,955 A * 6/1998 Goldenberg ......... G03B 21/625
                                                           359/452
8,760,766 B2   6/2014 Fujikawa
(Continued)

FOREIGN PATENT DOCUMENTS

CN    1873527 A    12/2006
CN  102955254 A     3/2013
(Continued)

OTHER PUBLICATIONS

Extended European Search Report (Application No. 16746655.6) dated Sep. 24, 2018.
(Continued)

*Primary Examiner* — Frank G Font
(74) *Attorney, Agent, or Firm* — Burr & Brown, PLLC

(57) ABSTRACT

In order to provide a transmission type screen having a flat scattered intensity within a predetermined scattering angle, a transmission type screen (50) according to the present invention comprising a first surface (51), and a second surface (52) opposed to the first surface (51), wherein: the first surface (51) is equipped with a microlens array (57) including a plurality of microlenses; the second surface (52) is equipped with a light diffusion surface (60); and a diffusion angle ratio of a diffusion angle of the light diffusion surface (60) relative to a diffusion angle of the microlens array (57) is not less than 0.2 and not more than 0.4.

10 Claims, 11 Drawing Sheets

(51) Int. Cl.
    *B60K 35/00* (2006.01)
    *G02B 3/00* (2006.01)
    *G02B 5/02* (2006.01)
    *G02B 26/10* (2006.01)
    *G02B 27/48* (2006.01)
    *G03B 21/00* (2006.01)
    *G02B 27/14* (2006.01)
    *G03B 21/62* (2014.01)
    *G09F 9/00* (2006.01)
    *H04N 5/74* (2006.01)

(52) U.S. Cl.
    CPC ......... *G02B 5/0221* (2013.01); *G02B 5/0278* (2013.01); *G02B 27/48* (2013.01); *G03B 21/00* (2013.01); *G03B 21/2013* (2013.01); *G03B 21/2033* (2013.01); *G03B 21/62* (2013.01); *G09F 9/00* (2013.01); *H04N 5/74* (2013.01); *B60K 2370/155* (2019.05); *B60K 2370/333* (2019.05); *B60K 2370/334* (2019.05); *G02B 26/105* (2013.01); *G02B 27/14* (2013.01); *G02B 2027/0118* (2013.01); *G03B 21/006* (2013.01); *G03B 21/008* (2013.01)

(58) Field of Classification Search
    CPC .............. G02B 26/105; G02B 27/0037; G02B 27/0056; G02B 27/01; G02B 27/0944; G02B 27/0961; G02B 27/14; G02B 27/42; G02B 2027/0118; B60K 35/00; B60K 2350/1072; B60K 2350/2047; B60K 2350/2052; G03B 21/00; G03B 21/2013; G03B 21/2033; G03B 21/62; G03B 21/006; G03B 21/008; G03B 21/60; G03B 21/602; G03B 21/625; G09F 9/00; H04N 5/74
    USPC ......... 359/205.1, 207.5, 443, 455, 459, 619, 359/707, 893; 353/38, 72; 180/90
    See application file for complete search history.

(56) References Cited

U.S. PATENT DOCUMENTS

| | | | |
|---|---|---|---|
| 9,880,441 B1* | 1/2018 | Osterhout | G02F 1/153 |
| 2006/0268404 A1* | 11/2006 | Hyobu | G03B 21/10 |
| | | | 359/456 |
| 2008/0007827 A1* | 1/2008 | Kinoshita | G03B 21/10 |
| | | | 359/446 |
| 2009/0002818 A1* | 1/2009 | Iwabu | G02B 3/0056 |
| | | | 359/457 |
| 2010/0053729 A1* | 3/2010 | Tilleman | G02B 6/14 |
| | | | 359/298 |
| 2012/0120344 A1* | 5/2012 | Kuroda | G02B 5/0231 |
| | | | 349/62 |
| 2013/0050655 A1* | 2/2013 | Fujikawa | G02B 27/0101 |
| | | | 353/38 |
| 2015/0219803 A1 | 8/2015 | Inamoto et al. | |

FOREIGN PATENT DOCUMENTS

| | | |
|---|---|---|
| EP | 1360529 A1 | 11/2003 |
| EP | 2 338 080 B1 | 1/2017 |
| JP | 59-060431 A1 | 4/1984 |
| JP | 02-213825 A1 | 8/1990 |
| JP | 2006-337459 A1 | 12/2006 |
| JP | 2007-187760 A1 | 7/2007 |
| JP | 2010-145745 A1 | 7/2010 |
| JP | 2015-145962 A1 | 8/2015 |

OTHER PUBLICATIONS

International Search Report and Written Opinion (Application No. PCT/JP2016/053200) dated Apr. 12, 2016.

Chinese Office Action (with English translation), Chinese Application No. 201680008404.2, dated Jul. 2, 2019 (12 pages).

* cited by examiner

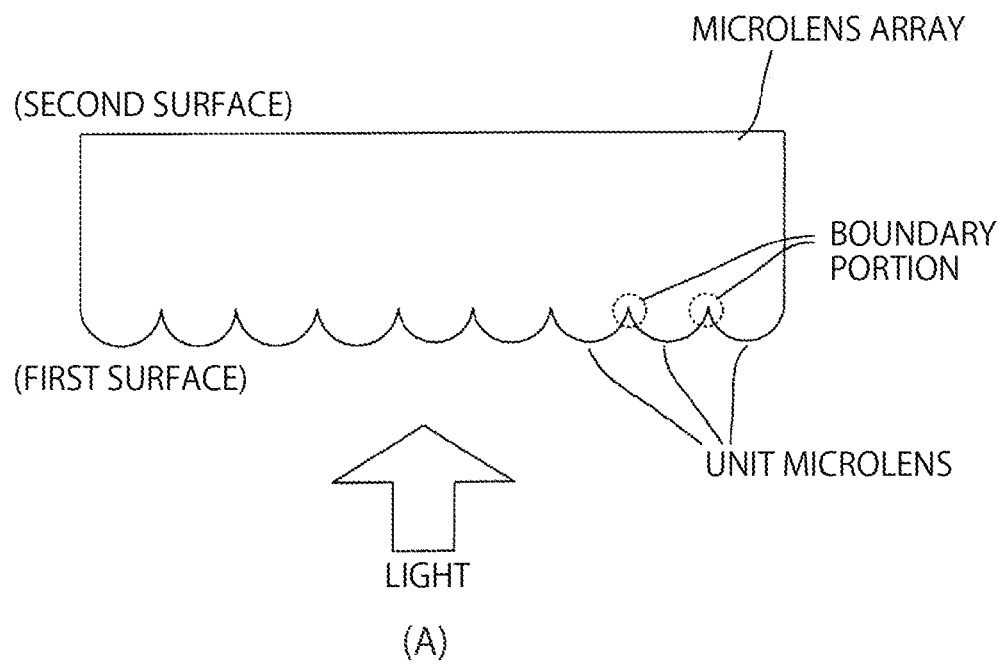
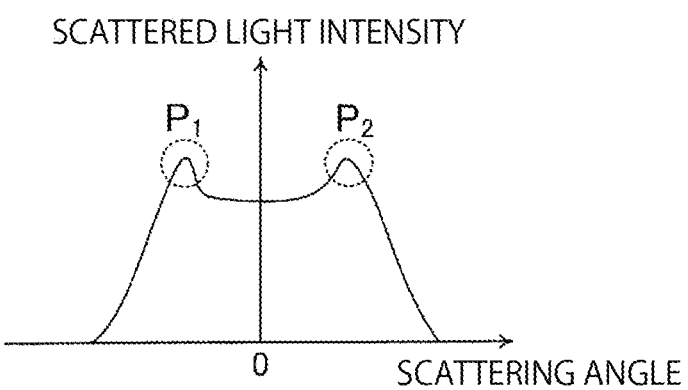
FIG. 23

TRANSMISSION TYPE SCREEN AND HEAD-UP DISPLAY DEVICE USING SAME

BACKGROUND OF THE INVENTION

1. Field of the Invention

The present invention relates to a transmission type screen capable of preventing reduction in brightness in an image peripheral part, and a head-up display device using such a transmission type screen.

2. Description of Related Art

For example, a head-up display (HUD) device for vehicle projects driving information (e.g., speed display and navigation display) as a virtual image such that the virtual image is projected ahead of a front windshield relative to a driver, i.e., the virtual image is superposed on a foreground of a front viewing field. A vehicle display system using such a HUD can restrain as much as possible movement of a line of vision of a driver, when he/she observes the driving information.

In the field of the above-described head-up displays and projectors, the use of a microlens array (MLA) as a transmission type screen is proposed.

As an example of a device in which a microlens array is used as a transmission type screen, Patent Document 1 (JP2010-145745A) discloses an image forming device including: a laser projector using laser light as a light source and configured to project an image formed by an array of pixels; a microlens array in which microlenses are arrayed; a condenser lens disposed on a light path between the laser projector and the microlens array, and configured to correct an image such that an incident angle of laser light incident on each microlens is included in an angular aperture of the microlens and to project the image; and an optical system enlargement element configured to enlarge an image formed on an emitting surface of the microlens array.

Patent Document 1: JP2010-145745A

SUMMARY OF THE INVENTION

In the head-up display device, as in the conventional example, when a microlens array that is an anisotropic diffuser is used as an optical element for a transmission type screen, distribution of light intensity in a view angle can be made small.

A problem that occurs when a microlens array is used as a transition screen of a head-up display device is described. FIG. 23 is a view describing the problem of a conventional microlens array, FIG. 23(A) is a schematic view of a microlens array, and FIG. 23(B) is a view showing a scattering angle dependence property of a scattered light intensity of the microlens array.

The property was obtained by making light enter into a first surface on which microlenses were provided, and measuring light emergent from a second surface. In view of the property, it can be understood that the scattered light intensity has two peaks $P_1$ and $P_2$.

A head-up display device is required to have uniform light intensity within a view angle. Namely, a transmission type screen of a head-up display device is required to have a scattered light intensity that is flat as much as possible within a predetermined scattering angle. However, as shown in FIG. 23(B), the conventional transmission type screen composed of a microlens array does not have a flat scattered light intensity, which causes a problem.

This problem is considered to be caused by a boundary between microlenses.

The object of the present invention has been made in order to solve the above problem. A transmission type screen according to the present invention comprises a first surface, and a second surface opposed to the first surface, wherein: the first surface is equipped with a microlens array including a plurality of microlenses; the second surface is equipped with a light diffusion surface; and a diffusion angle ratio of a diffusion angle of the light diffusion surface relative to a diffusion angle of the microlens array is not less than 0.2 and not more than 0.4.

In addition, in the transmission type screen according to the present invention, the light diffusion surface has micro-irregularities.

In addition, in the transmission type screen according to the present invention, a cycle of the micro-irregularities is random.

In addition, in the transmission type screen according to the present invention, an arithmetic average surface roughness of the light diffusion surface is not less than 0.13 μm and not more than 1.30 μm.

In addition, in the transmission type screen according to the present invention, a haze value of the light diffusion surface is not less than 35% and not more than 70%.

In addition, in the transmission type screen according to the present invention, the plurality of microlenses are arranged in a first direction and a second direction crossing the first direction, and a radius of curvature of each microlens in the first direction and a radius of curvature thereof in the second direction differ from each other.

In addition, a head-up display device according to the present invention is a head-up display device wherein the aforementioned transmission type screen is used.

In addition, the head-up display device includes: a laser light source configured to emit laser light; and a scanner configured to allow the laser light to scan on the transmission type screen.

In addition, the head-up display device includes: an LED configured to emit light; and an LCOS element configured to reflect the light onto the transmission type screen.

In addition, the head-up display device includes: an LED configured to emit light; and a DMD element configured to reflect the light onto the transmission type screen.

Due to the transmission type screen according to the present invention, a scattered light intensity is more uniform within a predetermined scattering angle.

In addition, since the head-up display device according to the present invention uses the aforementioned transmission type screen, a light intensity is more uniform within a view angle.

BRIEF DESCRIPTION OF THE DRAWINGS

FIG. 23 is a view describing a problem of a conventional microlens array.

DETAILED DESCRIPTION OF THE INVENTION

Figure 1:
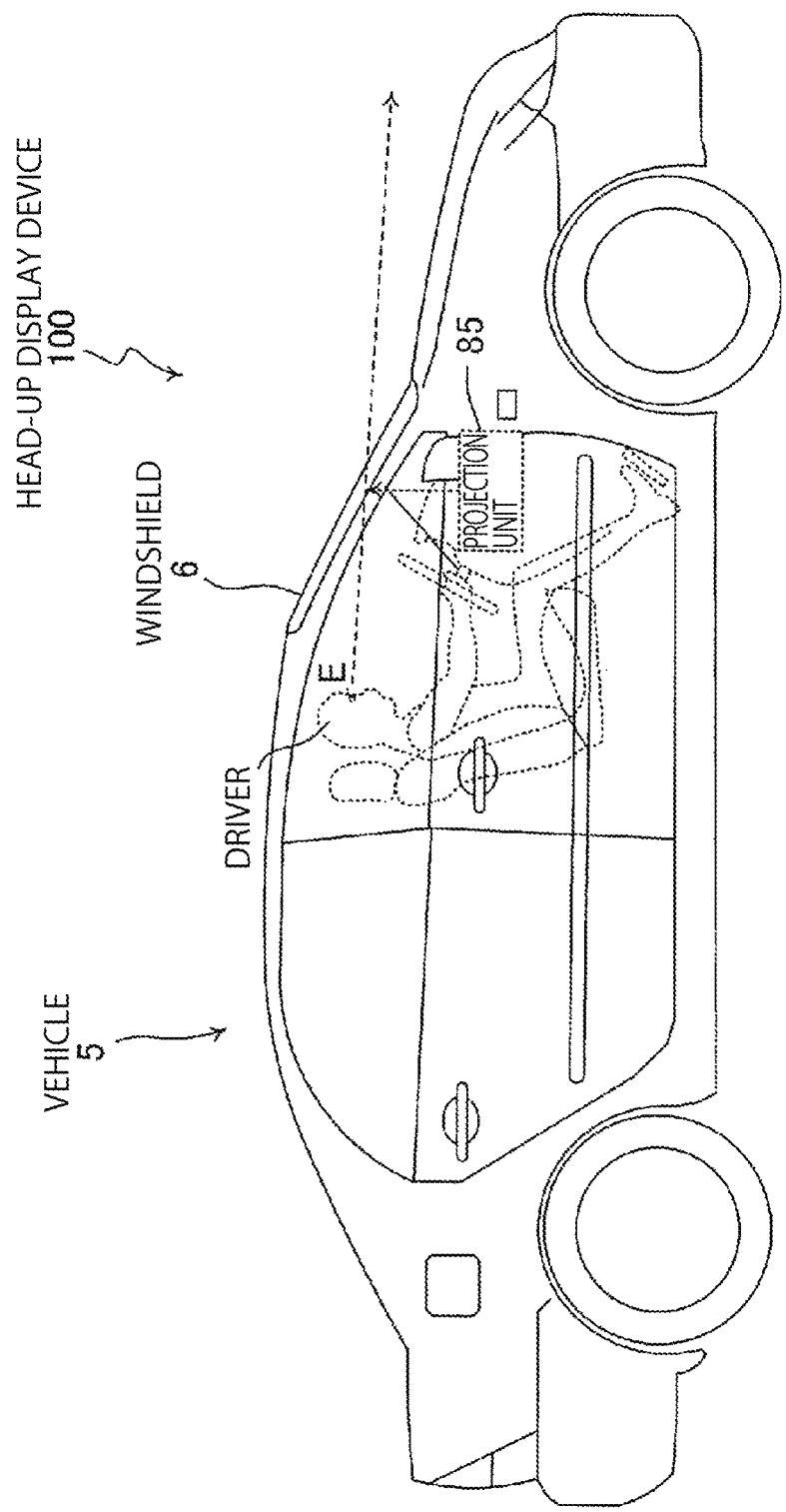
FIG. 1 is a view showing a vehicle 5 on which a head-up display device 100 according to an embodiment of the present invention is mounted.
Figure 2:
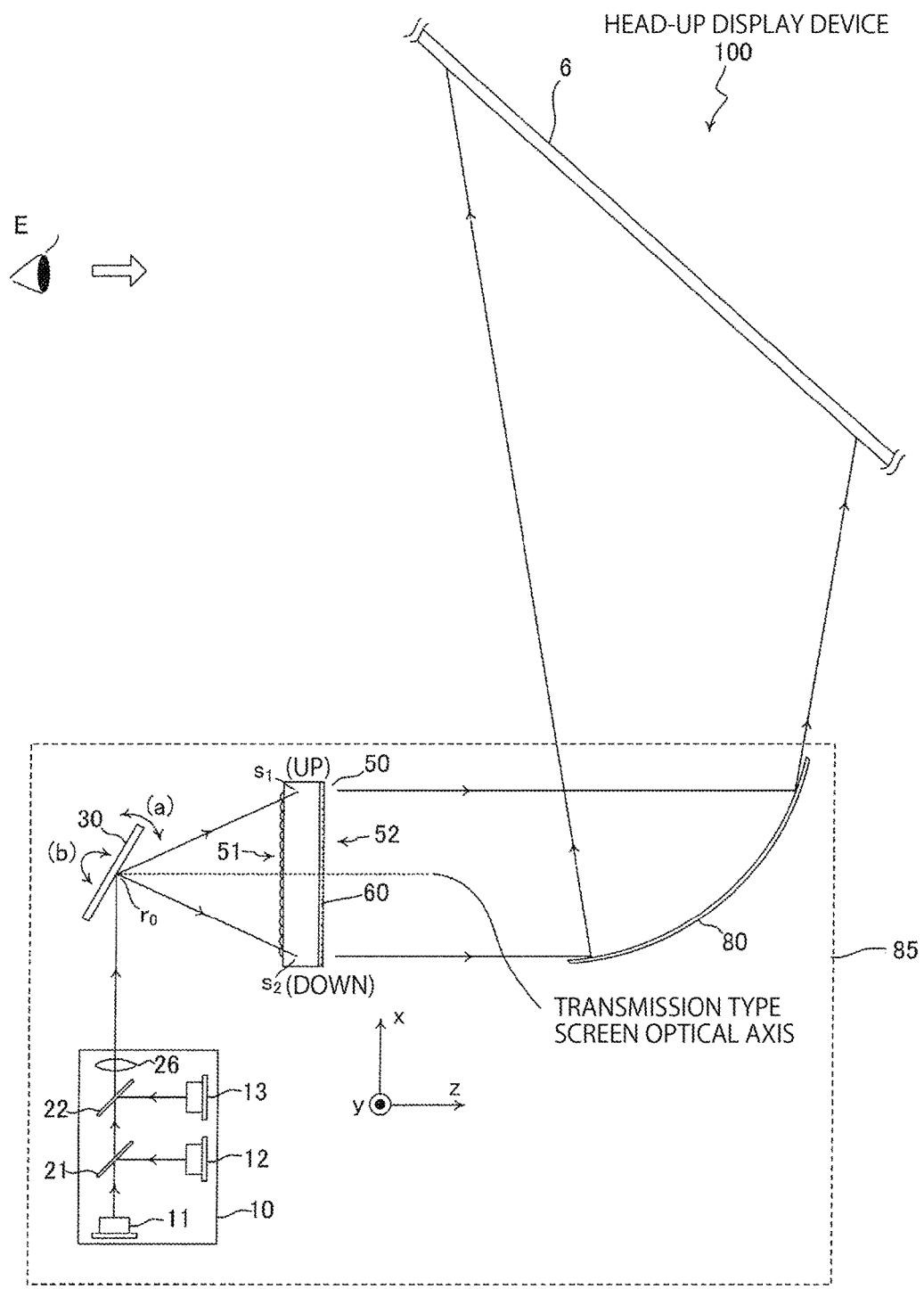
FIG. 2 is a view showing a structure of the head-up display device 100 according to the embodiment of the present invention.

Embodiments of the present invention will be described herebelow with reference to the drawings. FIG. 1 is a view showing a vehicle 5 on which a head-up display device 100 according to an embodiment of the present invention is mounted. FIG. 2 is a view showing a structure of the head-up display device 100 according to the embodiment of the present invention. The drawings explained below are schematic views, and may differ from an actual shape, size and arrangement.

The head-up display device 100 according to the embodiment of the present invention is to be mounted on the vehicle 5, and is configured to project, from a projecting unit 85, speed information display, navigation information display, etc., as a virtual image, onto a windshield 6 or a combiner (not shown) disposed between a driver and the windshield 6, so as make a superposed display in which the virtual image is superposed on a foreground of a front viewing field.

Figure 3:
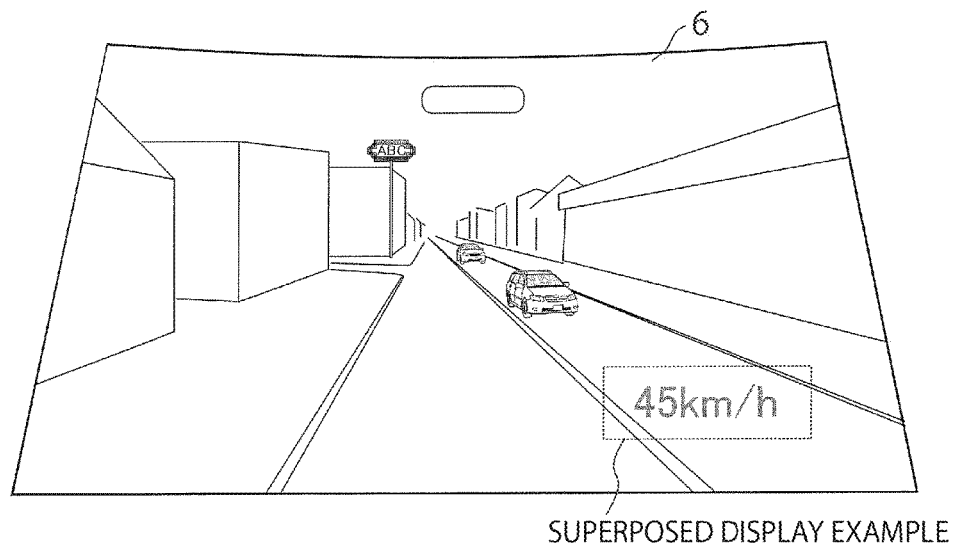
FIG. 3 is a view showing superposed image display of information performed by the head-up display device 100 according to the embodiment of the present invention.

FIG. 3 is a view showing superposed image display of information performed by the head-up display device 100 according to the embodiment of the present invention. FIG. 3 shows an example of an image of the windshield 6 viewed by a observer's eye E of a driver of the vehicle 5.

Next, details of the projecting unit 85 constituting the head-up display device 100 are described. FIG. 2 mainly shows an example of a structure of the projection unit 85 of the head-up display device 100 according to the embodiment of the present invention. Coordinates in the projection unit 85 are defined by three-dimensional orthogonal coordinates of x, y and z. For example, light emitted from a first light source 11 is light that is emitted in a direction parallel with the x direction. In addition, an optical axis of the transmission type screen 50 is in parallel with the z direction. The optical axis of the transmission type screen 50 is defined as a normal line of a first surface passing through a center of gravity of a microlens array 57.

A direction of the axis in parallel with the x-axis is sometimes referred to as a first direction, and a direction of the axis in parallel with the y-axis is sometimes referred to as a second direction (perpendicular to the first direction).

Light of an image to be displayed is emitted from a projector 10. The projector 10 includes a first light source 11, a second light source 12, a third light source 13, a first dichroic prism 21, a second dichroic prism 22, a collimator lens 26 and so on.

The first light source 11, the second light source 12 and the third light source 13 emit light of different wavelengths from one another. The first light source 11 emits light of a first wavelength, the second light source 12 emits light of a second wavelength, and the third light source 13 emits light of a third wavelength. In this embodiment, the light of the first wavelength emitted from the first light source 11 may be blue light, the light of the second wavelength emitted from the second light source 12 may be green light, and the light of the third wavelength emitted from the third light source 13 may be red light.

As the first light source 11, the second light source 12 and the third light source 13, various laser apparatuses such as semiconductor laser apparatuses (laser light sources) that emit laser light as coherent light.

In this embodiment, the light of the first wavelength emitted from the first light source 11 and the light of the second wavelength emitted from the second light source 12 respectively enter into different surfaces of the first dichroic prism 21, and the light of the third wavelength emitted from the third light source 13 enters into the second dichroic prism 22.

The light of the first wavelength emitted from the first light source 11 transmits through the first dichroic prism 21, while the light of the second wavelength emitted from the second light source 12 is reflected by the first dichroic prism 21. Thus, the light of the first wavelength and the light of the second wavelength are combined.

The thus combined light of the light of the first wavelength and the light of the second wavelength enters into the second dichroic prism 22.

The light of the first wavelength emitted from the first light source 11 and the light of the second wavelength emitted from the second light source 12 transmit through the second dichroic prism 22, while the light of the third wavelength emitted from the third light source 13 is reflected by the second dichroic prism 22. Thus, the light of the first wavelength, the light of the second wavelength and the light of the third wavelength are combined.

The laser light, which is the combination of the light of the first wavelength, the light of the second wavelength and the light of the third wavelength formed by the second dichroic prism 22, passes through the collimator lens 26 so as to be reflected by a projection mirror 30, and enters into the transmission type screen 50. The projection mirror 30 has a function of bidimensionally changing an angle. Thus, light incident thereon can be bidimensionally scanned, so that a projection image by desired laser light is formed.

The projection mirror 30 is configured to be movable in a rotation direction (a) about a first axis (not shown) in parallel with the y-axis, and to be movable in a rotation direction (b) about a second axis (not shown) perpendicular to the first axis.

The projection mirror 30 can be suitably replaced with another optical member, as long as it can bidimensionally scan light incident thereon. As such an optical member, it is possible to suitably use a galvanometer mirror, a galvanometer scanner, a polygon mirror, a prism, an acousto-optical element, an optical element using MEMS (Micro Electro Mechanical System) technique, etc.

In this embodiment, a point of the projection mirror 30 into which laser light enters and by which the laser light is reflected, and a point at which the optical axis of the transmission type screen 50 and the projection mirror 30 intersect with each other correspond to each other. An optical path length between a laser light reflection point $r_0$ in the projection mirror 30 and an uppermost scanning point $s_1$ in the transmission type screen 50, and an optical path length between the laser light reflection point $r_0$ in the projection mirror 30 and a lowermost scanning point $s_2$ in the transmission type screen 50, are equivalent to each other.

Laser light emergent from the projection mirror 30 is allowed to scan on the transmission type screen 50. The transmission type screen 50 is an optical member formed of a transparent substrate having a predetermined transmission factor or more.

The transmission type screen 50 can be formed by using and molding an organic resin material, or formed by using an inorganic material such as glass.

Figure 4:
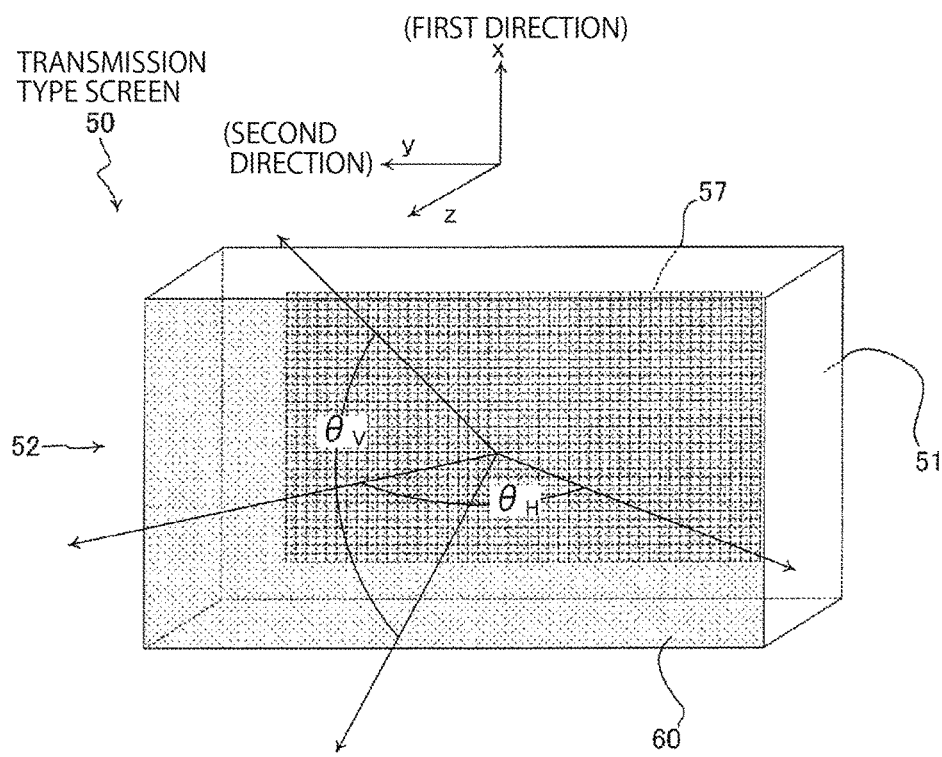
FIG. 4 is a perspective view of a transmission type screen 50 according to the embodiment of the present invention.

FIG. 4 is a perspective view of the transmission type screen 50 according to the embodiment of the present invention. A direction of the axis in parallel with the x-axis is defined as a first direction, and a direction of the axis in parallel with the y-axis is defined as a second direction (perpendicular to the first direction).

Under the above definitions, the transmission type screen 50 includes a first surface 51 extending in the first direction and the second direction perpendicular to the first direction, and a second surface 52 opposed to the first surface 51 and extending in the first direction and the second direction.

Figure 5:
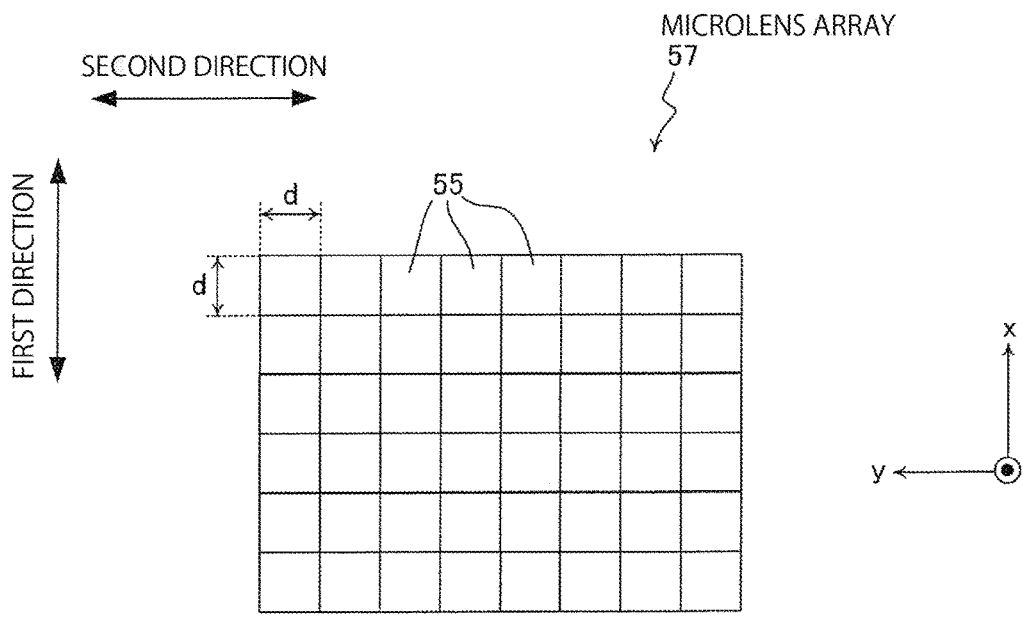
FIG. 5 is a view showing a microlens array 57 extending in a first direction and a second direction, which is seen from a z-axis direction.

In addition, the first surface 51 of the transmission type screen 50 is equipped with a microlens array 57 in which a plurality of microlenses 55 are cyclically arrayed. FIG. 5 is a view showing the microlens array 57 extending in the first direction and the second direction, which is seen from a z-axis direction. As shown in the figure, when seen from the z-axis direction, a square microlens 55 whose side length is d is used in the transmission type screen 50 according to the embodiment. Pitches along which the microlenses 55 are arrayed are preferably the same in the first direction and the second direction. This is because the microlenses 55 are densely arrayed so as to reduce straight transmission light.

Each microlens 55 is a spherical lens or a non-spherical lens. The microlens 55 has, at an apex on the side of the first surface 51, a curvature of a radius of curvature $R_1$ in the first direction and a curvature of a radius of curvature $R_2$ in the second direction. The apex means a point at which each microlens 55 projects most in the z-axis direction.

It is preferable that a sectional shape in a plane of each microlens 55, which is in parallel with the first direction and includes the optical axis of the microlens 55, differs from a sectional shape in a plane of each microlens 55, which is in parallel with the second direction and includes the optical axis of the microlens 55. In more detail, although the radius of curvature $R_1$ in the first direction and the radius of curvature $R_2$ in the second direction at the apex on the side of the first surface 51 of the microlens 55 may be equivalent to each other, they are preferably different from each other.

The reason is described below. In general, image information to be displayed by the head-up display device 100 has different aspect ratios. Thus, in order that reduction in brightness in an image peripheral part is prevented such that the reduction in brightness in upper and lower peripheral parts and the reduction in brightness in right and left peripheral parts are substantially the same, the radius of curvature $R_1$ in the first direction and the radius of curvature $R_2$ in the second direction at the apex on the side of the first surface 51 of the microlens 55 preferably differ from each other.

Further, in consideration that image information to be displayed by the head-up display device 100 is generally horizontally long, the radius of curvature $R_1$ in the first direction at the apex on the side of the first surface 51 of the microlens 55 is preferably larger than the radius of curvature $R_2$ in the second direction.

The second surface 52 of the transmission type screen 50 is equipped with a light diffusion surface 60 which functions as an isotropic light diffuser. The light diffusion surface 60 includes micro-irregularities of random cycle. On the other hand, a part (including the microlens array 57) of the transmission type screen 50, which is other than the light diffusion surface 60, is transparent and functions as anisotropic diffuser.

A concrete structure of the light diffusion surface 60 having micro-irregularities of random cycle will be apparent from the below description about manufacturing steps. Similarly to frosted glass, the light diffusion surface 60 is formed by providing micro-scratches in a smooth surface.

A diffuser panel may be used as the transmission type screen of the head-up display device 100. However, particularly in the head-up display device 100 that uses a laser light source as a light source, speckle noise caused by laser light can be advantageously more prevented by using the microlens array 57, as compared with the use of the diffuser panel.

In the transmission type screen according to the present invention, since an image is formed by the microlens array 57, light can be more efficiently transmitted in a viewing direction, as compared with a case in which an image is formed by using a screen, whereby increase in brightness can be achieved. In addition, sufficient brightness can be obtained even by a small quantity of light. Thus, an output of each laser light source can be decreased to save energy.

An image formed by the laser light on the microlens array 57 of the transmission type screen 50 is reflected by a concave mirror 80 so as to be projected on the windshield 6.

Thus, the driver can recognize the image reflected by the windshield 6. The projection unit 85 may be of either a structure in which an image is projected on the windshield 6 of the vehicle, or a structure in which an image is projected on a combiner (not shown) disposed between the driver and the windshield 6.

Although this embodiment employs a layout in which the first surface 51 having the microlens array 57 of the transmission type screen 50 is disposed on the side of the light source of laser light, a layout in which the second surface 52 of the transmission type screen 50 is disposed on the side of the light source may be employed. However, the former layout enables a clearer optical path, whereby a simulation precision upon design of the microlens array 57 can be improved.

An optical member disposed between the transmission type screen 50 and the windshield 6 or the combiner (not shown) is not limited to the concave mirror 80. Another suitable optical member can be used depending on a layout of the transmission type screen 50 and the windshield 6 or the combiner (not shown).

In the aforementioned embodiment, there is described an example in which the transmission type screen 50 is applied to the head-up display device 100 that employs a laser projector system including the projector 10 and the projection mirror 30 as a drawing system of the head-up display device 100. However, the transmission type screen 50 can be applied to the head-up display device 100 that employs an LCOS system using an LED and an LCOS (Liquid crystal on silicon) element, or a DLP (Digital Light Processing) system using an LED and a DMD (Digital Mirror Device) element.

In the case of the LCOS system, the head-up display device 100 can be realized in such a manner that light from the LED as a light source is selectively reflected by the LCOS element, which is a reflective liquid crystal element, toward the transmission type screen 50. On the other hand, in the case of the DLP system, the head-up display device 100 can be realized in such a manner that light from the LED as a light source is selectively reflected by the DMD element, which is a reflective element having a plurality of micro-mirrors, toward the transmission type screen 50.

Next, details of the transmission type screen 50 are described. Firstly, a base material of the transmission type screen 50 is described. Any material can be used as the base material of the transmission type screen 50, as long as it is a transparent material. For example, a thermoplastic resin, a thermosetting resin, a UV curing resin, an electron beam curing resin, glass or the like can be used.

When a thermoplastic resin is used as the base material of the transmission type screen 50, a polycarbonate resin, an acryl-based resin, a fluorine-based acryl resin, a silicone-based acryl resin, an epoxy acrylate resin, a polystyrene resin, a cycloolefin polymer, a methyl styrene resin, a fluorene resin, PET, polypropylene and so on can be used.

In addition, it is not necessary that the transmission type screen 50 is formed of one base material. It is possible that a part that functions as an anisotropic diffuser including the microlens array 57 and a part including the light diffusion surface 60 functioning as an isotropic light diffuser are manufactured as separate members, and that these members are joined by means of an adhesive and so on. Note that, in this case, all the members have preferably the same refractive index. Further, the part functioning as an anisotropic diffuser and the part including the light diffusion surface 60 are preferably formed of the same material.

Next, a method of processing the microlens array 57 in the transmission type screen 50 is described.

For example, the microlens array 57 can be formed in the following manner. A metal mold is mechanically cut into a microlens array mold by using a nano-machining apparatus, and the mold is transferred to a transparent resin. In addition, as the processing method of the microlens array 57, the method of transferring the mold to a resin by injection molding can be also used. In addition, a method in which the microlens array 57 is directly formed by mechanically cutting a transparent resin can also be used.

In order to control a light intensity distribution (diffusion angle or $\Delta L$, which will be described later) of a view angle of the head-up display device 100 by the above processing, the above-described non-spherical processing of nano unit is effective.

In addition, as the processing method of the microlens array 57, a resist/reflow method, an ink-jet method, an electron beam exposure method, a laser beam drawing method, a method using chemical etching or plasma etching, a method using a punch and so on can be employed.

Next, preferred optical properties of the transmission type screen 50 when the transmission type screen 50 is used in the head-up display device 100 are described. Firstly, a diffusion angle, which is frequently used later, is defined.

Figure 6:
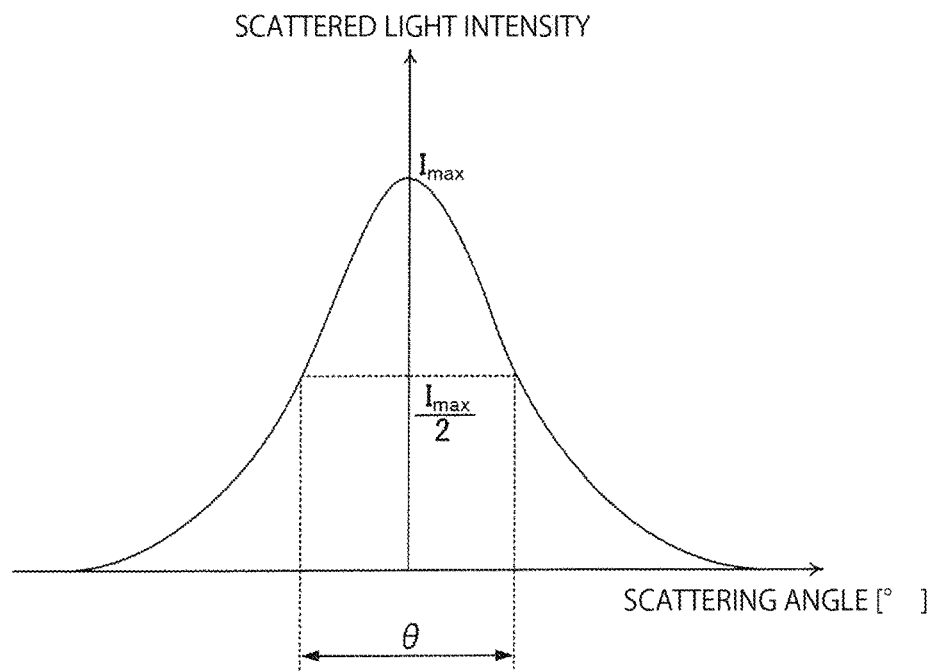
FIG. 6 is a view for describing a definition of a diffusion angle.

FIG. 6 is a view for describing a definition of the diffusion angle. In this specification, a diffusion angle $\theta$ is defined as follows. Light is perpendicularly made to enter into the transmission type screen 50, and a maximum scattered light intensity $I_{max}$ of the light emergent from the transmission type screen 50 is obtained. The diffusion angle $\theta$ is a full width at half maximum (FWHM) that is a difference between two angles which are half the maximum scattered light intensity $I_{max}$.

Under the above definition, in the transmission type screen 50, a diffusion angle $\theta_H$ in the horizontal direction (second direction) and a diffusion angle $\theta_V$ in the vertical direction (first direction), which are shown in FIG. 4, has preferably a relationship $\theta_H > \theta_V$. This is because image information to be displayed by the head-up display device 100 is horizontally long.

Further, preferably, the horizontal diffusion angle $\theta_H$ is not less than 20° and not more than 60°, and the vertical diffusion angle $\theta_V$ is not less than 5° and not more than 35°. More preferably, the horizontal diffusion angle $\theta_H$ is not less than 20° and not more than 50°, and the vertical diffusion angle $\theta_V$ is not less than 10° and not more than 30°. In this case, the transmission type screen 50 used in the head-up display device 100 is optimum.

Next, two parameters $\Delta L$ and $S_{80-20}$, which are suitable parameters when the transmission type screen 50 used in the head-up display device 100 is selected, are described.

Figure 7:
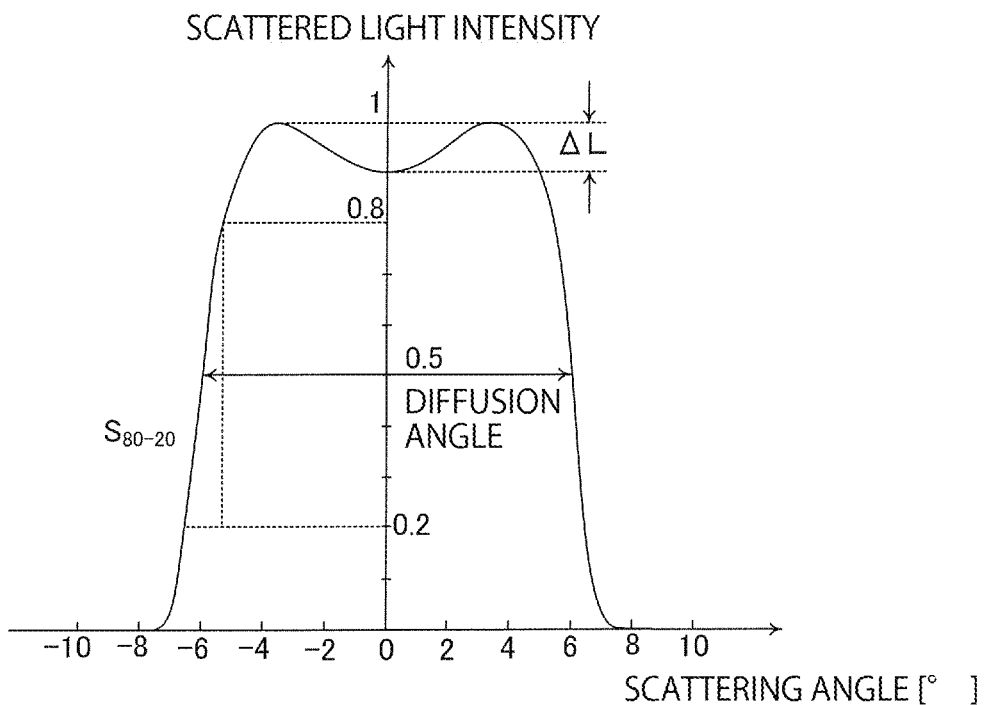
FIG. 7 is a view for describing definitions of ΔL and $S_{80\text{-}20}$.
Figure 8:
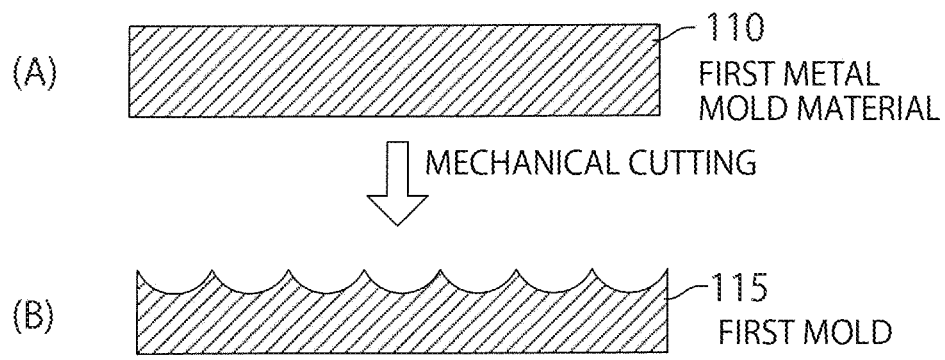
FIG. 8 is a view for describing a manufacturing step(s) of the transmission type screen 50 according to the embodiment of the present invention.
Figure 9:
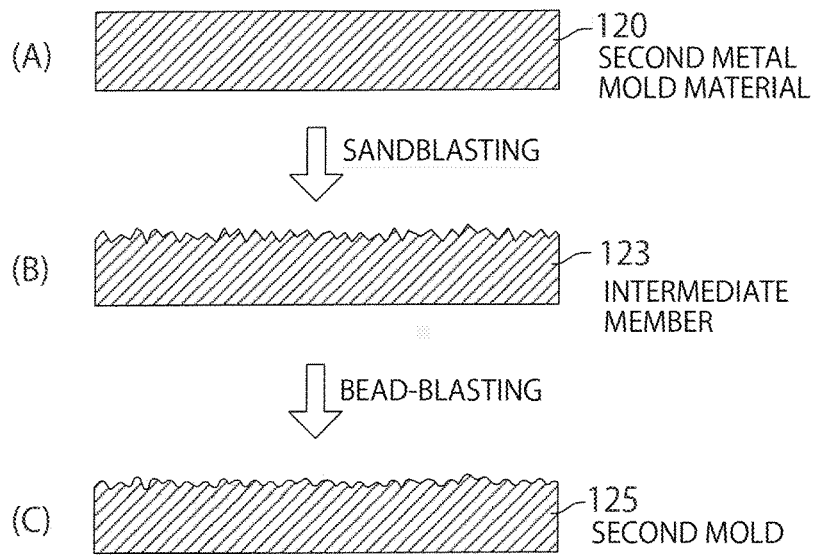
FIG. 9 is a view for schematically describing a manufacturing step(s) of the transmission type screen 50 according to the embodiment of the present invention.

FIG. 7 is a view for describing definitions $\Delta L$ and $S_{80-20}$. $\Delta L$ is a ratio of a difference between a maximum value and a minimum value relative to the maximum value, of standardized scattered light intensity of light emergent from the transmission type screen 50. When there is no minimum value, $\Delta L$ is regarded as 0. When such $\Delta L$ is not more than 7%, more preferably, not more than 5%, the transmission type screen 50 used in the head-up display device 100 is optimum. $S_{80-20}$ is defined as an angular difference between 80% of a scattered light intensity of light emergent from the transmission type screen 50 and 20% thereof. When $S_{80-20}$ is not more than 10%, more preferably, not more than 7%, the transmission type screen 50 used in the head-up display 100 is optimum.

The scattered light intensity is based on a Y value of the XYZ color system (CIE1931 color system).

Next, a manufacturing step example of the transmission type screen 50 according to the embodiment of the present invention is described. FIGS. 8 to 11 are views for schematically describing manufacturing steps of the transmission type screen 50 according to the embodiment of the present invention.

FIG. 8(A) shows a first metal mold material 110. One surface of such a first metal mold material 110 is mechanically cut by a nano-machining apparatus (not shown) so as to obtain a first mold 115 in which a pattern corresponding to the microlens array 57 is formed, as shown in FIG. 8(B). Although this embodiment uses a method of transferring the microlens array 57 to a resin by injection molding by means of such a first mold 115, a method in which the microlens array 57 is directly machined in a transparent resin by mechanical cutting can be also used.

In order to increase the mass-production capacity of the transmission type screens 50, a method in which the first mold 115 is created by mechanical cutting by means of a nano-machining apparatus, and the microlens array 57 is transferred to a resin by injection molding is most preferred.

In order to control a light intensity distribution (diffusion angle and ΔL) of a view angle, the transmission type screen 50 is required to be subjected to a non-spherical processing of nano unit. The nano-machining apparatus can be suitably used in this processing.

FIG. 9(A) shows a second metal mold material 120. One surface of such a second metal mold material 120 is sandblasted, so as to obtain an intermediate member 123 shown in FIG. 9(B). Then, the sandblasted surface of the intermediate member 123 is further bead-blasted, so as to obtain a second mold 125 shown in FIG. 9(C).

This embodiment employs a method in which micro-irregularities are transferred to a resin by injection molding by means of such a second metal mold material 120. Since micro-irregularities are transferred to the blasted surface, a cycle of the irregularities is random. The thus manufactured micro-irregularities function as the light diffusion surface 60, so that light is isotropically diffused. The term "random" means that the array of micro-irregularities does not have regularity.

In this embodiment, the second metal mold material 120 is sandblasted and is further bead-blasted so as to form a transfer pattern of the micro-irregularities. However, the transfer pattern of the micro-irregularities may be formed only by either sandblasting or bead-blasting the second metal mold material 120.

Note that, when the second metal mold material 120 is sandblasted and is further bead-blasted so as to form a transfer pattern of the micro-irregularities, the diffusion property can be controlled by the sandblasting and the surface can be smoothened by the bead-blasting. Thus, haze of the light diffusion surface 60 created by the second mold 125 can be reduced.

Figure 10:
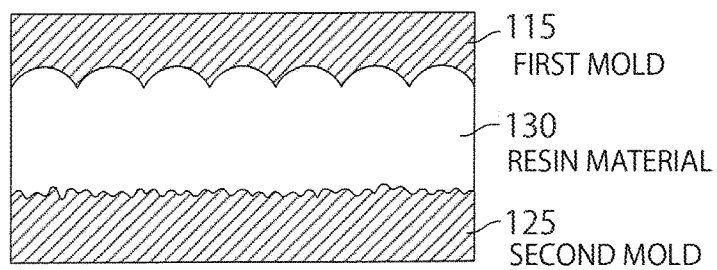
FIG. 10 is a view for schematically describing a manufacturing step(s) of the transmission type screen 50 according to the embodiment of the present invention.
Figure 11:
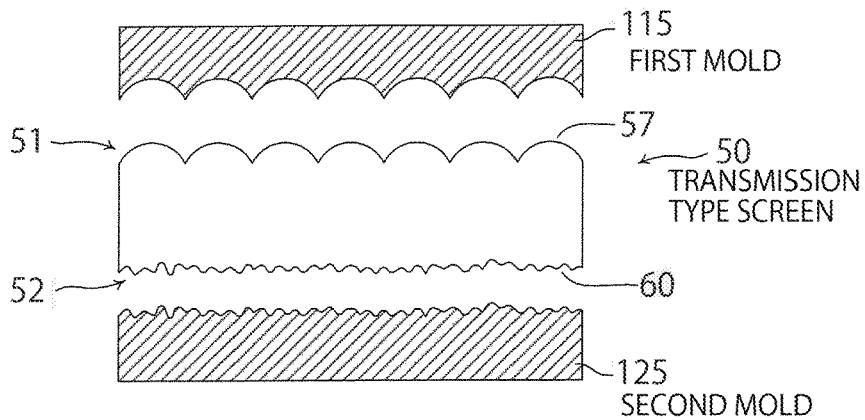
FIG. 11 is a view for schematically describing a manufacturing step(s) of the transmission type screen 50 according to the embodiment of the present invention.

FIG. 10 shows that a space between the first mold 115 and the second mold 125 is filled with a transparent resin material 130. FIG. 11 shows that, after the resin material 130 is cured (solidified), the resin material 130 is demolded from the first mold 115 and the second mold 125, so as to obtain the transmission type screen 50 according to the present invention.

The above manufacturing process of the transmission type screen 50 according to the embodiment of the present invention is a mere example, and another manufacturing process can be employed. FIGS. 12 to 16 are views schematically showing manufacturing steps of the transmission type screen 50 according to another embodiment of the present invention.

Figure 12:
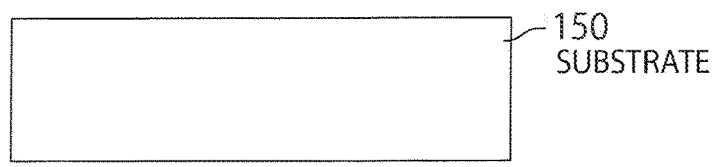
FIG. 12 is a view for schematically describing a manufacturing step(s) of the transmission type screen 50 according to another embodiment of the present invention.

A transparent substrate 150 having two main surfaces shown in FIG. 12 is prepared. For example, a polycarbonate rein can be used as a material of such a substrate 150.

Figure 13:
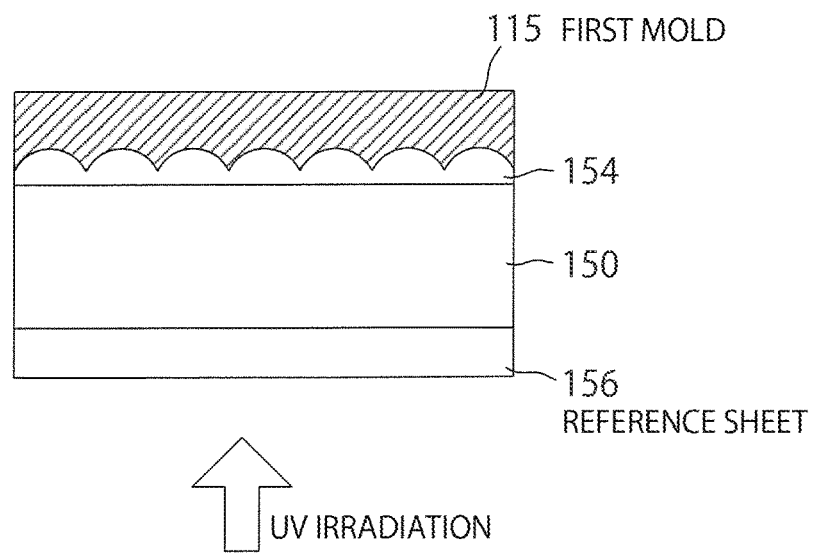
FIG. 13 is a view for schematically describing a manufacturing step(s) of the transmission type screen 50 according to another embodiment of the present invention.

Then, as shown in FIG. 13, a first mold 115 to which an ultraviolet curing resin material 154 is applied is arranged on one surface of the substrate 150, and a reference sheet 156 is arranged on the other surface of the substrate 150. The substrate 150 is irradiated with ultraviolet light from the side of the reference sheet 156 so as to cure the ultraviolet curing resin material 154.

Figure 14:
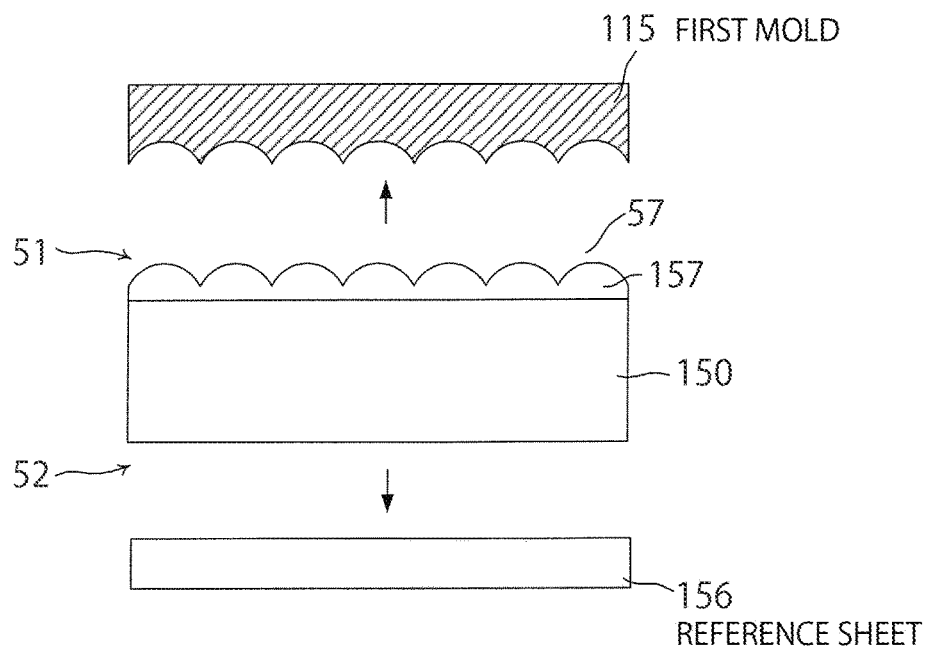
FIG. 14 is a view for schematically describing a manufacturing step(s) of the transmission type screen 50 according to another embodiment of the present invention.

Then, as shown in FIG. 14, the first mold 115 is remolded, and the reference sheet 156 is peeled, so that it is possible to obtain the substrate 150 which is equipped, on the one surface thereof, with a microlens array part 157 obtained by curing the ultraviolet curing resin material 154.

Figure 15:
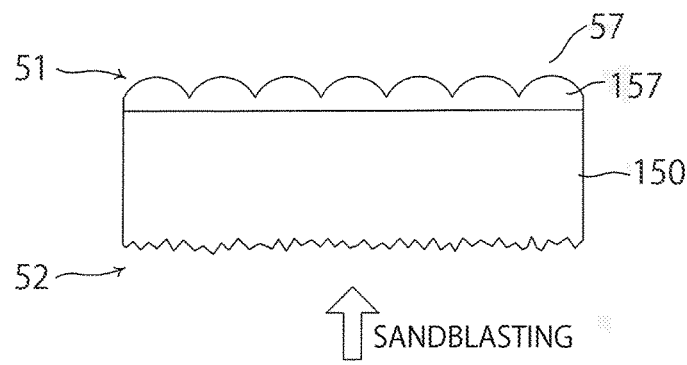
FIG. 15 is a view for schematically describing a manufacturing step(s) of the transmission type screen 50 according to another embodiment of the present invention.
Figure 16:
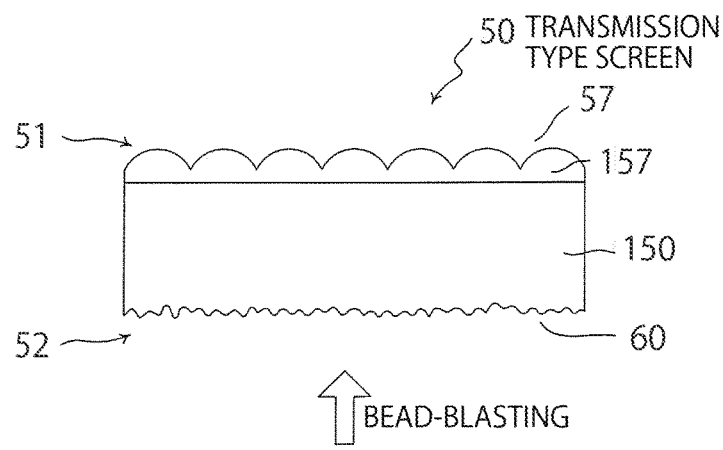
FIG. 16 is a view for schematically describing a manufacturing step(s) of the transmission type screen 50 according to another embodiment of the present invention.

Following thereto, in the step shown in FIG. 15, the other surface of the substrate 150, which is not equipped with the microlens array part 157, is sandblasted. After that, the other surface, which is sandblasted by the step shown in FIG. 15, is bead-blasted as shown in FIG. 16, so as to obtain micro-irregularities. Thus, the transmission type screen 50 having the light diffusion surface 60 can be obtained.

In this embodiment, the other surface of the substrate is sandblasted and is further bead-blasted so as to form the micro-irregularities. However, the micro-irregularities may be formed on the other surface of the substrate 150 only by either sandblasting or bead-blasting the other surface of the substrate 150.

Note that, when the other surface of the substrate is sandblasted and is further bead-blasted so as to form the micro-irregularities, the diffusion property can be controlled by the sandblasting and the surface can be smoothened by the bead-blasting. Thus, haze of the light diffusion surface 60 created by the other surface of the substrate 150 can be reduced.

When the micro-irregularities are formed on the other surface of the substrate 150 so as to obtain the light diffusion surface 60, a method other than blasting, which is disclosed in JP2012-001000A and JP2012-040878A, can be employed.

The above-described micro-irregularities can be obtained as an arithmetic average surface roughness Sa. The arithmetic average surface roughness Sa can be obtained based on International Standard ISO 25178: Geometric Product Specifications (GPS)—Surface texture: areal. As a concrete measuring method, the arithmetic average surface roughness Sa can be obtained by measuring the micro-irregularities by means of a laser microscope OLS4100 (Olympus) or VK-X (Keyence).

When A represents a planar dimension of an area to be measured, and Z(x, y) represents a height at a point (x, y) in the area to be measured, the arithmetic average surface roughness Sa has a relationship of below Expression (1).

$$S_a = \frac{1}{A} \int\int_A |Z(x, y)| \, dxdy \tag{1}$$

Sa of the micro-irregularities of the light diffusion surface can be measured by a laser microscope OLS4100 (Olympus)

or VK-X (Keyence) (because the structure of the micro-irregularities is not a structure not more than wavelength).

EXAMPLES

By using the above-described first mold 115 and the second mold 125 and by employing the manufacturing process for manufacturing the transmission type screen 50 by injection molding, respective samples were created.

As the first molding material 110 and the second metal mold material 120, telescopic molds capable of injection molding an outline of 60 mm×90 mm×2 mmt were created using NAK80 manufactured by Daido Steel Co., Ltd.

Then, the first metal molding material 110 was mechanically cut (ROBONANO manufactured by FANUC) to form the following two kinds of first molds 115 on which a non-spherical microlens array was inverted.

Pitch: 30 μm, Height: 5 μm, Largeness: 50 mm×80 mm
Pitch: 40 μm, Height: 5 μm, Largeness: 50 mm×80 mm Following thereto, the second metal mold material 120 was machined according to the following procedure, so as to create 13 kinds of second molds 125 on which a random micro-irregularity pattern was formed. (Note that there is included one second mold 125 in which (Procedure 2) was omitted.)

(Procedure 1)
Sandblasting with different particle sizes of white alumina (WA)
(Procedure 2)
Bead-blasting with different particle sizes of glass beads (GB)

Then, the first mold 115 and the second cold 125 were assembled and injection-molded, so that the transmission type screen 50 in which the microlens array 57 and the light diffusion surface 60 formed of the micro-irregularities were combined was obtained. A material and injection molding conditions were as follows.

Polycarbonate resin: Panlite manufactured by Teijin Chemicals Ltd.
Apparatus: MD100X manufactured by Niigata Machine Techno Co., Ltd.
Mold temperature: 120° C.
Resin temperature: 320° C.

The following samples were produced by the above manufacturing process. A scattered light intensity by bending was measured by a three-dimensional gonio-spectrophotometric color measurement system (GCMS-13 type, manufactured by Murakami Color research Laboratory), and various parameters were calculated.

Two kinds of samples having only the microlens array 57 and not having the light diffusion surface 60 (isotropic diffuser). (Samples shown in FIG. 17(B))
Sample name:
$MLA_1$, $MLA_2$
13 kinds of samples having only the light diffusion surfaces 60 of different arithmetic average surface roughness Sa and not having the microlens array 57. (Samples shown in FIG. 17(A))
Sample name:
$D_1$, $D_2$, $D_3$, $D_4$, $D_5$, $D_6$, $D_7$, $D_8$, $D_9$, $D_{10}$, $D_{11}$, $D_{12}$, $D_{13}$
As the suffix value added to D of sample name increases, the arithmetic average surface roughness Sa increases.
26 kinds of samples having forms of the transmission type screens 26 in which the microlens array 57 and the light diffusion surface 60 (isotropic diffuser) were overlapped. (Samples shown in FIG. 17(C))

Sample name:
$MLA_1+D_1$, $MLA_1+D_2$, $MLA_1+D_3$, $MLA_1+D_4$, $MLA_1+D_5$, $MLA_1+D_6$, $MLA_1+D_7$, $MLA_1+D_8$, $MLA_1+D_9$, $MLA_1+D_{10}$, $MLA_1+D_{11}$, $MLA_1+D_{12}$, $MLA_1+D_{13}$ $MLA_2+D_1$, $MLA_2+D_2$, $MLA_2+D_3$, $MLA_2+D_4$, $MLA_2+D_5$, $MLA_2+D_6$, $MLA_2+D_7$, $MLA_2+D_8$, $MLA_2+D_9$, $MLA_2+D_{10}$, $MLA_2+D_{11}$, $MLA_2+D_{12}$, $MLA_2+D_{13}$ Tables 1 to 4 show the result. Table 2 shows the processing condition of the second mold 125, an arithmetic average surface roughness Sa of the light diffusion surface 60 created by the second mold 125, and a haze value of the light diffusion surface 60. A measuring method of a haze value is based on JIS K 7136.

A column "diffusion angle ratio" of Tables 3 and 4 shows a calculated value of diffusion angle of $D_X$/diffusion angle of $MLA_Y$. In addition, Tables 3 and 4 show an arithmetic average surface roughness Sa of the light diffusion surface 60, and a haze value of the light diffusion surface 60.

In Tables 3 and 4, it is determined that a sample having ΔL and $S_{80-20}$ both of which are not more than 7% is a suitable transmission type screen 50 used in the head-up display device 100. The values diffusion angle of $D_X$/diffusion angle of $MLA_Y$, the arithmetic average surface roughness Sa and the haze values satisfying the condition are marked with an asterisk.

TABLE 1

| Sample Name | Unit Microlens Maximum Point Size [μm] | Diffusion Angle [°] | ΔL | $S_{80-20}$ |
|---|---|---|---|---|
| $MLA_1$ | 30 | 23.3 | 12.5 | 3.6 |
| $MLA_2$ | 40 | 14.8 | 3.5 | 2.9 |

Characteristics with only microlens array

TABLE 2

| Sample Name | Particle Diameter upon processing of Metal Mold material | | Arithmetic Average Surface Roughness [μm] | Haze Value [%] | Diffusion Angle [°] |
|---|---|---|---|---|---|
| | WA Particle Diameter [μm] | GB Particle Diameter [μm] | | | |
| $D_1$ | 11.5 | 150 | 0.03 | 15.6 | 2.8 |
| $D_2$ | 11.5 | 50 | 0.04 | 18.7 | 3.0 |
| $D_3$ | 11.5 | 20 | 0.05 | 32.0 | 4.0 |
| $D_4$ | 20 | 150 | 0.12 | 34.3 | 4.2 |
| $D_5$ | 20 | 50 | 0.13 | 38.5 | 4.6 |
| $D_6$ | 20 | 20 | 0.18 | 45.0 | 5.3 |
| $D_7$ | 30 | 150 | 0.23 | 48.3 | 5.7 |
| $D_8$ | 30 | 50 | 0.40 | 50.7 | 6.0 |
| $D_9$ | 30 | 20 | 0.97 | 53.7 | 6.4 |
| $D_{10}$ | 115 | 150 | 1.14 | 64.6 | 8.1 |
| $D_{11}$ | 115 | 50 | 1.27 | 69.9 | 9.3 |
| $D_{12}$ | 115 | 20 | 1.33 | 73.8 | 9.9 |
| $D_{13}$ | 115 | — | 1.74 | 95.1 | 15.7 |

Characteristics with only light diffusion surface

TABLE 3

Characteristics with combination of microlens
array and light diffusion surface (1)

| Sample Name | Diffusion Angle [°] | ΔL | $S_{80-20}$ | Diffusion Angle Ratio | Light Diffusion Surface Sa [μm] | Light Diffusion Surface Haze Value (%) |
|---|---|---|---|---|---|---|
| $MLA_1 + D_1$ | 23.5 | 11.8 | 3.5 | 0.12 | 0.03 | 15.6 |
| $MLA_1 + D_2$ | 24.0 | 11.5 | 3.8 | 0.13 | 0.04 | 18.7 |
| $MLA_1 + D_3$ | 24.0 | 11.3 | 3.2 | 0.17 | 0.05 | 32.0 |
| $MLA_1 + D_4$ | 24.3 | 11.0 | 3.7 | 0.18 | 0.12 | 34.3 |
| $MLA_1 + D_5$ | 24.1 | 6.5 | 4.5 | 0.20* | 0.13* | 38.5* |
| $MLA_1 + D_6$ | 24.0 | 5.5 | 4.3 | 0.23* | 0.18* | 45.0* |
| $MLA_1 + D_7$ | 24.5 | 3.5 | 4.5 | 0.24* | 0.23* | 48.3* |
| $MLA_1 + D_8$ | 25.1 | 3.0 | 5.3 | 0.26* | 0.40* | 50.7* |
| $MLA_1 + D_9$ | 24.2 | 3.2 | 5.5 | 0.27* | 0.97* | 53.7* |
| $MLA_1 + D_{10}$ | 25.9 | 3.9 | 6.5 | 0.35* | 1.14* | 64.6* |
| $MLA_1 + D_{11}$ | 24.9 | 3.4 | 6.8 | 0.40* | 1.27* | 69.9* |
| $MLA_1 + D_{12}$ | 25.2 | 3.5 | 8.0 | 0.42 | 1.33 | 73.8 |
| $MLA_1 + D_{13}$ | 24.9 | 3.1 | 9.5 | 0.67 | 1.74 | 95.1 |

TABLE 4

Characteristics with combination of microlens
array and light diffusion surface (2)

| Sample Name | Diffusion Angle [°] | ΔL | $S_{80-20}$ | Diffusion Angle Ratio | Light Diffusion Surface Sa [μm] | Light Diffusion Surface Haze Value (%) |
|---|---|---|---|---|---|---|
| $MLA_2 + D_1$ | 14.8 | 3.5 | 3.7 | 0.19* | 0.03* | 15.6* |
| $MLA_2 + D_2$ | 14.9 | 3.4 | 4.2 | 0.20* | 0.04* | 18.7* |
| $MLA_2 + D_3$ | 15.0 | 3.3 | 3.8 | 0.27* | 0.05* | 32.0* |
| $MLA_2 + D_4$ | 15.0 | 3.2 | 4.0 | 0.28* | 0.12* | 34.3* |
| $MLA_2 + D_5$ | 15.1 | 2.9 | 5.2 | 0.31* | 0.13* | 38.5* |
| $MLA_2 + D_6$ | 15.5 | 2.6 | 4.3 | 0.36* | 0.18* | 45.0* |
| $MLA_2 + D_7$ | 15.6 | 2.9 | 4.0 | 0.39* | 0.23* | 48.3* |
| $MLA_2 + D_8$ | 16.7 | 2.6 | 4.6 | 0.41* | 0.40* | 50.7* |
| $MLA_2 + D_9$ | 16.4 | 3.1 | 4.8 | 0.43* | 0.97* | 53.7* |
| $MLA_2 + D_{10}$ | 17.5 | 3.2 | 6.5 | 0.55* | 1.14* | 64.6* |
| $MLA_2 + D_{11}$ | 17.3 | 2.1 | 6.7 | 0.63* | 1.27* | 69.9* |
| $MLA_2 + D_{12}$ | 18.1 | 1.0 | 7.8 | 0.67 | 1.33 | 73.8 |
| $MLA_2 + D_{13}$ | 19.0 | 0.6 | 9.8 | 1.06 | 1.74 | 95.1 |

In Table 3, it can be understood that a sample having the value of diffusion angle of $D_X$/diffusion angle of $MLA_Y$ (diffusion angle ratio) which is not less than 0.2 and not more than 0.4 is suited as the transmission type screen 50.

Similarly, in Table 4, it can be understood that a sample having the value of diffusion angle of $D_X$/diffusion angle of $MLA_Y$ (diffusion angle ratio) which is substantially not less than 0.2 and not more than 0.6 is suited as the transmission type screen 50.

Thus, in both Tables 3 and 4, a sample having a suitable diffusion angle ratio is employed as the transmission type screen 50 according to the present invention. Namely, a suitable transmission type screen 50 according to the present invention has the diffusion angle of the light diffusion surface 60 which is not less than 0.2 times and not more than 0.4 times the diffusion angle of the microlens array 57. A rate of the diffusion angle of the light diffusion surface 60 relative to the diffusion angle of the microlens array 57 (light diffusion angle ratio) being not less than 0.2 and not more than 0.4 is suitable.

In addition, in Table 3, it can be understood that a sample having an arithmetic average surface roughness Sa of the light diffusion surface 60 which is substantially not less than 0.13 μm and not more than 1.30 μm is suited as the transmission type screen 50.

Similarly, the Table 4, it can be understood that a sample having an arithmetic average surface roughness Sa of the light diffusion surface 60 which is substantially not less than 0.03 μm and not more than 1.30 μm is suited as the transmission type screen 50.

From above, both in the case of Table 3 and Table 4, a sample in which the light diffusion surface 60 has a suitable arithmetic surface roughness Sa is employed as the transmission type screen 50 according to the present invention. Namely, a transmission type screen in which an arithmetic surface roughness Sa of the light diffusion surface 60 is not less than 0.13 μm and not more than 1.30 μm is suited as the transmission type screen 50 according to the present invention.

In addition, in Table 3, it can be understood that a sample in which a haze value of the light diffusion surface 60 is substantially not less than 35% and not more than 70% is suited as the transmission type screen 50.

Similarly, in Table 4, it can be understood that a sample in which a haze value of the light diffusion surface 60 is substantially not less than 15% and not more than 70% is suited as the transmission type screen 50.

From above, both in the case of Table 3 and Table 4, a sample in which the light diffusion surface 60 has a suitable haze value is employed as the transmission type screen 50 according to the present invention. Namely, a transmission type screen in which a haze value of the light diffusion surface 60 is not less than 35% and not more than 70% is suited as the transmission type screen 50 according to the present invention.

When a haze value is too large, a transmission factor lowers, which results in a dark image. On the other hand, when a haze value is too small, a suitable diffusion cannot be obtained. Thus, it can be estimated that to constitute the transmission type screen 50 in such a manner that a haze value of the light diffusion surface 60 is in a range between 35% and 70% is preferred.

Figure 17:
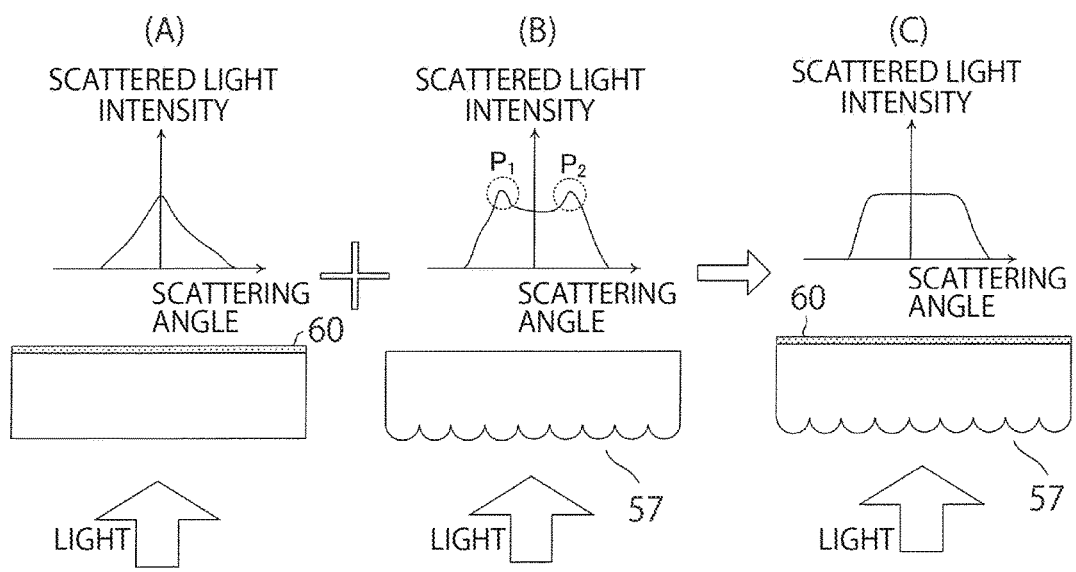
FIG. 17 is a view for describing an effect of the transmission type screen 50 according to the embodiment of the present invention.

FIG. 17 is a view for describing an effect of the transmission type screen 50 according to the embodiment of the present invention. In FIG. 17, (A) is a characteristic diagram showing a scattering angle dependence of a scattered light intensity of an isotropic diffuser only, (B) is a characteristic diagram showing a scattering angle dependence of a scattered light intensity of the microlens array 57 only, and (C) is a characteristic diagram showing a scattering angle dependence of a scattered light intensity of the transmission type screen 50 according to the present invention in which the isotropic diffuser and the microlens array 57 are combined.

When only the isotropic diffuser as shown in (A) is used as a transmission type screen, a light intensity thereof is a Gaussian distribution in which the center (0°) has intensive brightness. Thus, a light intensity variation within a view angle is large.

On the other hand, in the case of only the microlens array 57 as shown in (B), the scattered light intensity has two peaks $P_1$ and $P_2$, which is described above in the "DISCLOSURE OF THE INVENTION" column.

Thus, in the transmission type screen 50 according to the present invention, (A) and (B) are combined, i.e., the isotropic diffuser and the microlens array 57 are combined, whereby the characteristics of (A) and (B) are combined. At this time, it was experimentally found out that it is preferable that a rate of the diffusion angle of the light diffusion surface 60 as the isotropic diffuser relative to the diffusion angle of the microlens array 57 (light diffusion angle ratio) is not less than 0.2 and not more than 0.4.

As described above, in the transmission type screen 50 according to the present invention, the second surface 52 is equipped with the light diffusion surface 60, and a rate of the diffusion angle of the light diffusion surface 60 relative to the diffusion angle of the microlens array 57 is not less than 0.2 and not more than 0.4. As a result, according to the transmission type screen 50 according to the present invention, a scattered light intensity is flat within a predetermined scattering angle.

In addition, since the head-up display device 100 according to the present invention uses the aforementioned transmission type screen 50, the head-up display device 100 according to the present invention has a uniform light intensity within a view angle.

Next, another embodiment of the present invention is described. The second embodiment differs from the above first embodiment only in the structure of the microlens array 57 provided on the first surface 51 of the transmission type screen 50. Thus, this point is described.

Figure 18:
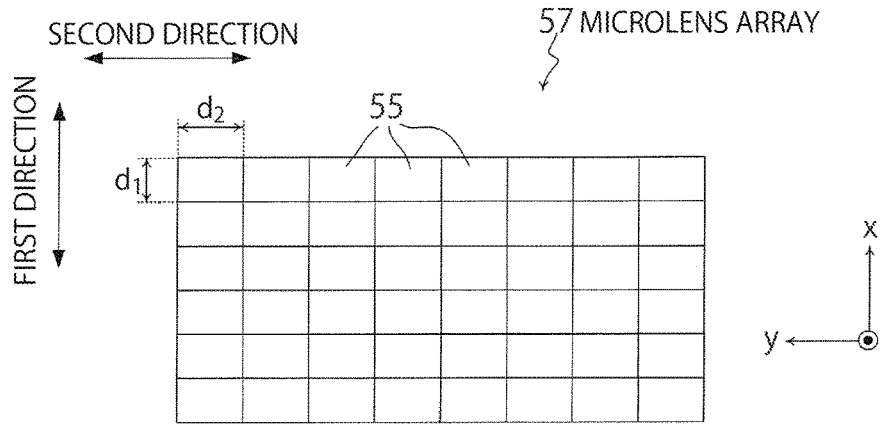
FIG. 18 is a view showing a microlens array 57 extending in a first direction and a second direction, which is seen from a z-axis direction, of the transmission type screen 50 according to another embodiment of the present invention.

FIG. 18 is a view showing a microlens array 57 extending in a first direction and a second direction, which is seen from a z-axis direction, of the transmission type screen 50 according to another embodiment of the present invention.

The microlens 55 of the microlens array 57 provided on the first surface 51 of the transmission type screen 50 according to the first embodiment is square, when seen from the z-axis direction. On the other hand, the microlens 55 of the microlens array 57 provided on the first surface 51 of the transmission type screen 50 according to the second embodiment is structured as a rectangle, when seen from the z-axis direction.

When a length $d_1$ in the first direction and a length $d_2$ in the second direction are compared, $d_1 < d_2$ is preferable. This is because image information to be displayed by the head-up display device 100 is generally horizontally long.

In addition, also in this embodiment, in consideration that image information to be displayed by the head-up display device 100 is horizontally long, the radius of curvature $R_1$ in the first direction at the apex on the side of the first surface 51 of each microlens 55 is preferably larger than the radius of curvature $R_2$ in the second direction.

Also according to the above embodiment, the same effect as that of the first embodiment can be obtained.

Next, another embodiment of the present invention is described. The third embodiment differs from the above first embodiment only in the structure of the microlens array 57 provided on the first surface 51 of the transmission type screen 50. Thus, this point is described.

Figure 19:
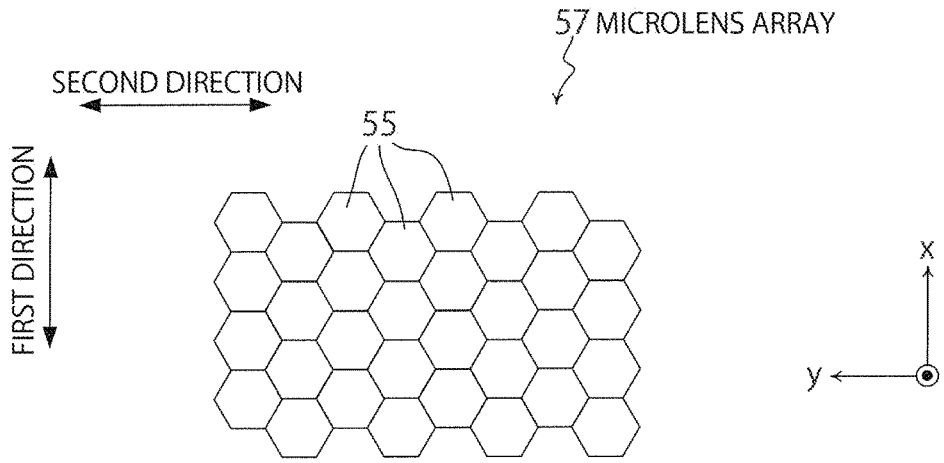
FIG. 19 is a view showing a microlens array 57 extending in a first direction and a second direction, which is seen from a z-axis direction, of the transmission type screen 50 according to another embodiment of the present invention.

FIG. 19 is a view showing a microlens array 57 extending in a first direction and a second direction, which is seen from a z-axis direction, of the transmission type screen 50 according to another embodiment of the present invention.

The microlens 55 of the microlens array 57 provided on the first surface 51 of the transmission type screen 50 according to the first embodiment is square, when seen from the z-axis direction. On the other hand, the microlens 55 of the microlens array 57 provided on the first surface 51 of the transmission type screen 50 according to the third embodiment is structured as a regular hexagon, when seen from the z-axis direction.

Also in this case, in consideration that image information to be displayed by the head-up display device 100 is horizontally long, the radius of curvature $R_1$ in the first direction at the apex on the side of the first surface 51 of each microlens 55 is preferably larger than the radius of curvature $R_2$ in the second direction.

Also according to the above embodiment, the same effect as that of the first embodiment can be obtained.

Next, another embodiment of the present invention is described. The fourth embodiment differs from the above first embodiment only in the structure of the microlens array 57 provided on the first surface 51 of the transmission type screen 50. Thus, this point is described.

Figure 20:
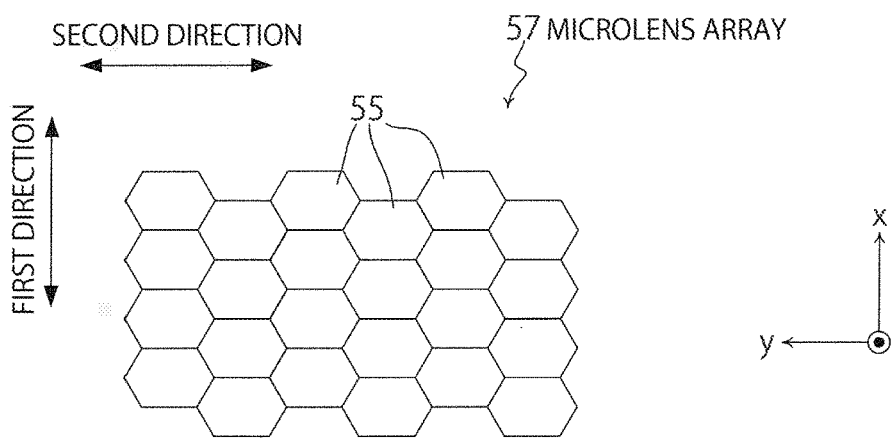
FIG. 20 is a view showing a microlens array 57 extending in a first direction and a second direction, which is seen from a z-axis direction, of the transmission type screen 50 according to another embodiment of the present invention.

FIG. 20 is a view showing a microlens array 57 extending in a first direction and a second direction, which is seen from a z-axis direction, of the transmission type screen 50 according to another embodiment of the present invention.

The microlens 55 of the microlens array 57 provided on the first surface 51 of the transmission type screen 50 according to the first embodiment is square, when seen from the z-axis direction. On the other hand, the microlens 55 of the microlens array 57 provided on the first surface 51 of the transmission type screen 50 according to the fourth embodiment is structured as a hexagon that is not a regular hexagon, when seen from the z-axis direction.

As the hexagon constituting the microlens 55, a horizontally long hexagon is preferable in which only a side in parallel with the second direction is longer than lengths of other sides. This is because image information to be displayed by the head-up display device 100 is generally horizontally long.

In addition, also in this embodiment, in consideration that image information to be displayed by the head-up display device 100 is horizontally long, the radius of curvature $R_1$ in the first direction at the apex on the side of the first surface 51 of each microlens 55 is preferably larger than the radius of curvature $R_2$ in the second direction.

Also according to the above embodiment, the same effect as that of the first embodiment can be obtained.

Next, another embodiment of the present invention is described. The fifth embodiment differs from the above first embodiment only in the structure of the microlens array 57 provided on the first surface 51 of the transmission type screen 50. Thus, this point is described.

Figure 21:
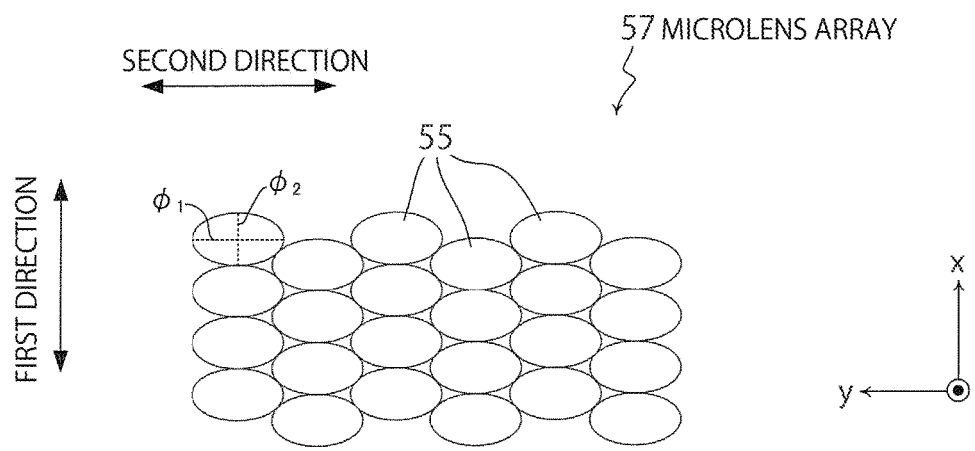
FIG. 21 is a view showing a microlens array 57 extending in a first direction and a second direction, which is seen from a z-axis direction, of the transmission type screen 50 according to another embodiment of the present invention.

FIG. 21 is a view showing a microlens array 57 extending in a first direction and a second direction, which is seen from a z-axis direction, of the transmission type screen 50 according to another embodiment of the present invention.

The microlens 55 of the microlens array 57 provided on the first surface 51 of the transmission type screen 50 according to the first embodiment is square, when seen from the z-axis direction. On the other hand, the microlens 55 of the microlens array 57 provided on the first surface 51 of the transmission type screen 50 according to the fifth embodiment is structured as an ellipse, when seen from the z-axis direction.

As the ellipse constituting the microlens 55, a horizontally long ellipse is preferable in which a major axis $\phi_1$ in parallel with the second direction and a minor axis $\phi_2$ is in parallel with the first direction. This is because image information to be displayed by the head-up display device 100 is generally horizontally long.

Also in this case, in consideration that image information to be displayed by the head-up display device 100 is horizontally long, the radius of curvature $R_1$ in the first direction at the apex on the side of the first surface 51 of each microlens 55 is preferably larger than the radius of curvature $R_2$ in the second direction.

Also according to the above embodiment, the same effect as that of the first embodiment can be obtained.

Next, another embodiment of the present invention is described. The sixth embodiment differs from the above first embodiment only in the structure of the microlens array 57 provided on the first surface 51 of the transmission type screen 50. Thus, this point is described.

Figure 22:
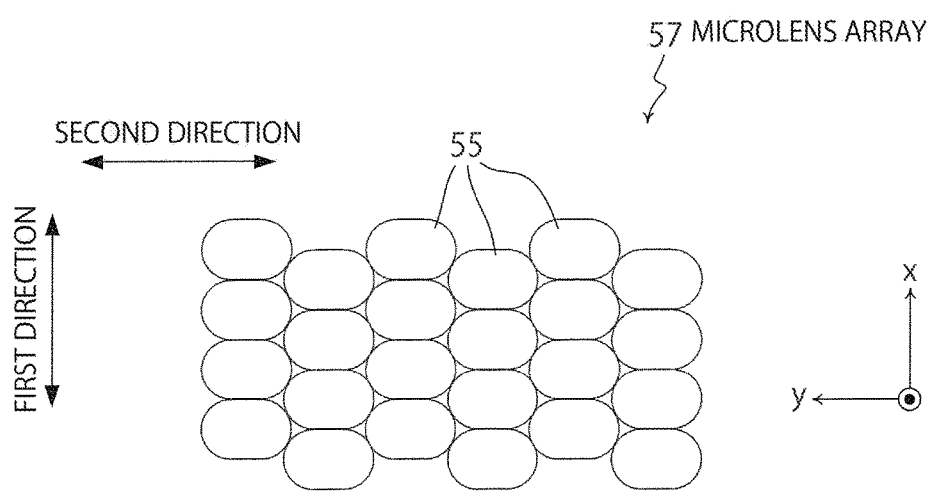
FIG. 22 is a view showing a microlens array 57 extending in a first direction and a second direction, which is seen from a z-axis direction, of the transmission type screen 50 according to another embodiment of the present invention.

FIG. 22 is a view showing a microlens array 57 extending in a first direction and a second direction, which is seen from a z-axis direction, of the transmission type screen 50 according to another embodiment of the present invention.

The microlens 55 of the microlens array 57 provided on the first surface 51 of the transmission type screen 50 according to the first embodiment is square, when seen from the z-axis direction. On the other hand, the microlens 55 of the microlens array 57 provided on the first surface 51 of the transmission type screen 50 according to the sixth embodiment is structured as a koban (Japanese old coin) shape, when seen from the z-axis direction.

As the koban constituting the microlens 55, a horizontally long koban is preferable in which a linear part of the koban shape is in parallel with the second direction. This is because image information to be displayed by the head-up display device 100 is generally horizontally long.

In addition, also in this embodiment, in consideration that image information to be displayed by the head-up display device 100 is horizontally long, the radius of curvature $R_1$ in the first direction at the apex on the side of the first surface 51 of each microlens 55 is preferably larger than the radius of curvature $R_2$ in the second direction.

Also according to the above embodiment, the same effect as that of the first embodiment can be obtained.

The present invention is not limited only to the first to sixth embodiments, and an embodiment in which structures of the respective embodiments are suitably combined is included in the scope of the present invention.

A transmission type screen of a head-up display device is required to have a scattered light intensity that is flat as much as possible within a predetermined scattering angle. However, a conventional transmission type screen formed by a microlens array does not have a flat scattered light intensity, which causes a problem. On the other hand, in the transmission type screen according to the present invention, the second surface is equipped with the light diffusion surface, and a rate of the diffusion angle of the light diffusion surface relative to the diffusion angle of the microlens array is not less than 0.2 and not more than 0.4. Thus, the transmission type screen according to the present invention has a flat scattered light intensity within a predetermined scattering angle. Thus, the transmission type screen according to the present invention has a great industrial applicability.

DESCRIPTION OF REFERENCE NUMERALS

5 Vehicle
6 Windshield
10 Projector
11 First light source
12 Second light source
13 Third light source
21 First dichroic prism
22 Second dichroic prism
26 Collimator lens
30 Projection mirror (scanner)
50 Transmission type screen
51 First surface
52 Second surface
55 Microlens
57 Microlens array
60 Light diffusion surface
80 Concave mirror
85 Projection unit
100 Head-up display device
110 First metal mold material
115 First mold
120 Second metal mold material
123 Intermediate member
125 Second mold
130 Resin material
150 Substrate
154 Ultraviolet curing resin material
156 Reference sheet
157 Microlens array part

The invention claimed is:

1. A transmission type screen comprising:
a first surface; and
a second surface opposed to the first surface;
wherein the first surface is equipped with a microlens array including a plurality of microlenses;
wherein the second surface is equipped with a light diffusion surface;
wherein the microlens array and light diffusion surface each have a diffusion angle defined as a full width at half maximum that is a difference between two angles at half of the maximum scattered light intensity of a light perpendicularly entering into, and emerging from, the transmission type screen; and
wherein a diffusion angle ratio of the diffusion angle of the light diffusion surface relative to the diffusion angle of the microlens array is not less than 0.2 and not more than 0.4.

2. The transmission type screen according to claim 1, wherein the light diffusion surface has micro-irregularities.

3. The transmission type screen according to claim 2, wherein a repeating pattern of the micro-irregularities is random.

4. The transmission type screen according to claim 1, wherein an arithmetic average surface roughness of the light diffusion surface is not less than 0.13 μm and not more than 1.30 μm.

5. The transmission type screen according to claim 1, wherein a haze value of the light diffusion surface is not less than 35% and not more than 70%.

6. The transmission type screen according to claim 1, wherein the plurality of microlenses are arranged in a first direction and a second direction crossing the first direction; and
wherein a radius of curvature of each microlens in the first direction and a radius of curvature thereof in the second direction differ from each other.

7. A head-up display device comprising the transmission type screen according to claim 1.

8. The head-up display device according to claim 7, further comprising:
a laser light source configured to emit laser light; and
a scanner configured to allow the laser light to scan on the transmission type screen.

9. The head-up display device according to claim 7, further comprising:
an LED configured to emit light; and
an LCOS element configured to reflect the light onto the transmission type screen.

10. The head-up display device according to claim 7, further comprising:
an LED configured to emit light; and
a DMD element configured to reflect the light onto the transmission type screen.

* * * * *